March 8, 1932.  J. C. BLAIR  1,848,102
PROCESS AND APPARATUS FOR PRODUCING SHEET GLASS
Filed July 14, 1928  2 Sheets-Sheet 1
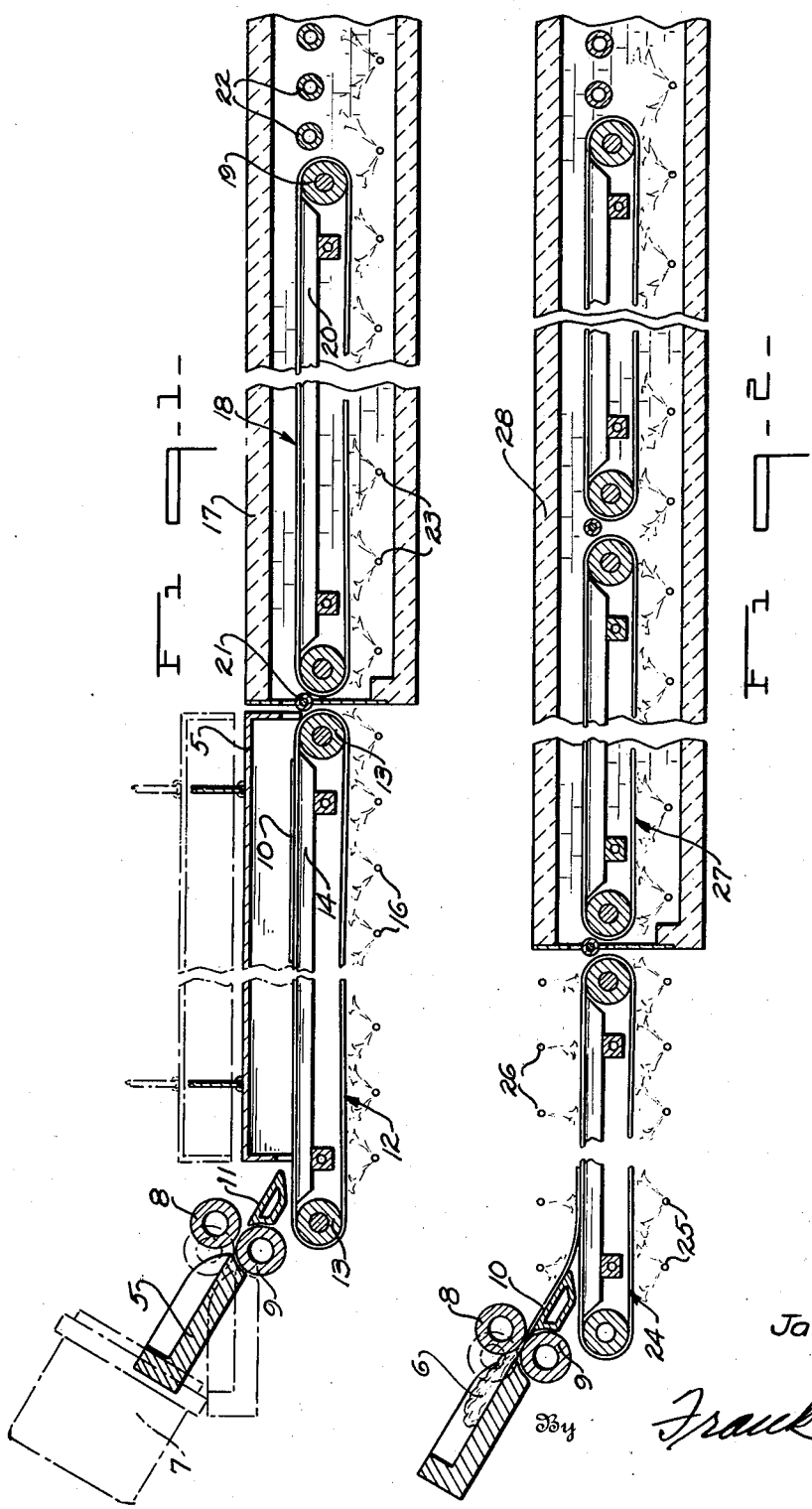
Inventor
James C. Blair
By Frank Fraser
Attorney March 8, 1932. J. C. BLAIR 1,848,102
PROCESS AND APPARATUS FOR PRODUCING SHEET GLASS
Filed July 14, 1928 2 Sheets-Sheet 2
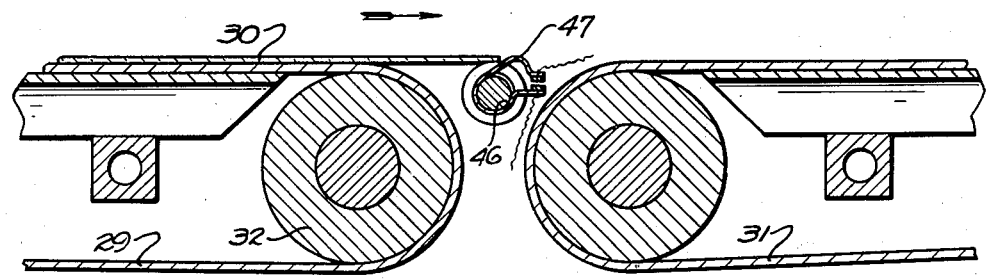
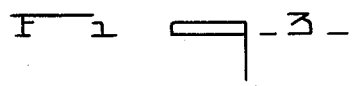
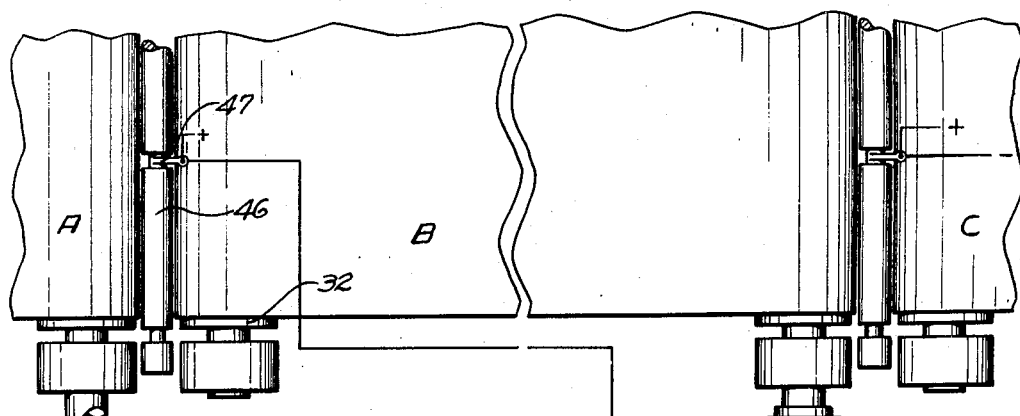
Inventor
James C. Blair
By Frank Fraser
Attorney Patented Mar. 8, 1932

1,848,102

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed July 14, 1928. Serial No. 292,832.

The present invention relates to a process and an apparatus for producing sheet glass.

An important object of the invention is to provide a process and an apparatus for producing sheet glass wherein a mass of molten glass is reduced at a relatively high speed to sheet glass, which sheet is deposited upon a variable speed drive movable conveyor moving at the forming speed of the sheet, the size of the conveyor being such that it will support the entire sheet at one time, the speed of the conveyor being reduced before the sheet starts to enter an annealing leer so that the sheet is passed into the leer at a speed materially less than the forming speed thereof, the sheet being supported upon and conveyed through the leer by means of other conveyors whose speed can be varied as desired.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through an apparatus illustrating one form of the invention, Fig. 2 is a similar section through a slightly modified form of construction, Fig. 3 is a fragmentary vertical longitudinal section through a portion of the apparatus, and Fig. 4 is a top plan thereof.

Referring to Fig. 1, the numeral 5 designates a receiver or support adapted to receive a mass of molten glass 6. The mass of glass is supplied to the support 5 when in the position indicated in dotted lines in Fig. 1 from a pot 7 indicated in dotted lines. Ordinarily, the receiver 5 is of such size as to receive the entire contents of the pot 7.

Associated with one end of the receiver 5 is a pair of rolls 8 and 9 arranged to create a sheet forming pass through which the molten glass 6 is moved and reduced to a sheet 10 of substantially predetermined and uniform thickness. As illustrated, the support 5 and upper roll 8 are movable as a unit about the axis of rotation of the lower sheet forming roll 9. Any suitable drive means may be provided to positively rotate the rolls 8 and 9 in opposite directions to form the sheet, as the present invention is in no way limited to any specific type of sheet rolling mechanism, although it does relate to an intermittent process of sheet production.

It is desirable that the sheet of glass 10 be formed at a relatively high rate of speed and thus the rolls 8 and 9 are rotated in a manner that their peripheral speed will reduce the mass of molten glass 6 rapidly to sheet form. A slab 11 may be positioned as indicated to receive the sheet 10 issuing from the sheet forming pass, the slab 11 being so arranged that it will deposit or guide the sheet 10 upon a conveyor 12. In Fig. 1, a single conveyor is illustrated, and it consists of an endless belt formation trained about the drums or sprockets 13, either one of which, or both, may be positively driven. The drive for the drums 13, and consequently the conveyor 12, is of a variable speed type so that the speed of the conveyor can be changed and controlled as desired.

Positioned beneath the upper horizontal run of the endless belt conveyor 12 is a table 14 designed to support the conveyor belt in a manner that it will present a flat surface for the sheet of glass 10 resting thereon, the reasons for which will be readily understood.

During the formation of the sheet 10 by means of the rolls 8 and 9, the conveyor 12 is driven so that its speed will be the same as the sheet forming speed, thus permitting the glass sheet to be deposited on said conveyor and moved forwardly at the same speed as the peripheral speed of the rolls, thus preventing buckling, etc. of the sheet. The length of the conveyor 12 in Fig. 1 is sufficient to receive the entire length of sheet 10 formed from the mass of glass 6. To protect the sheet while on the conveyor 12, a hood 15 is provided, which hood may be placed in an elevated position as indicated in dotted lines in Fig. 1 during the rolling of the sheet. When desired, the hood may be placed in a lowered position as represented in full lines. To further protect the sheet and prevent undue chilling thereof, the conveyor 12 may be heated by the burners 16, although of course electrical units or other suitable heating means may be resorted to.

After the entire sheet 10 is supported upon the conveyor 12, the speed of the conveyor is materially reduced so that said sheet will be fed into an annealing leer 17 at a speed substantially less than the speed of the sheet forming mechanism. Provided to receive the sheet as it enters the leer 17 is a second conveyor 18 which may be of similar construction to the conveyor 12. Thus, drums or sprockets 19 may be provided to drive the conveyor while the table 20 supports the upper horizontal run of said conveyor. A roll 21 or other means is placed between the adjacent ends of the conveyors 12 and 18 to prevent sagging of the sheet in its passage from one conveyor to the other. During the passage of the sheet from the conveyor 12 to the conveyor 18, the speed of the conveyors is identical.

By way of example only, we will assume that the sheet of glass is formed at the rate of sixty feet per minute. During the formation of the sheet, therefore, the conveyor 12 is operated so that its surface moves at sixty feet per minute. Then after the entire sheet is supported upon the conveyor which is moving at sixty feet per minute, the speed is reduced to forty or fifty feet per minute. If the speed is reduced to forty feet per minute, then the conveyor 18 is also operated to run at forty feet per minute, making it possible for the sheet to pass from conveyor 12 to conveyor 18.

Positioned to receive the sheet from the conveyor 18 in Fig. 1, is a plurality of rolls 22 also provided with a variable speed drive and the rolls 22 may be provided throughout the rest of the leer. In the example given above, the sheet is moving on the conveyor 18 at forty feet per minute. After the entire sheet is supported upon the conveyor 18, its speed is reduced to—we will assume—ten feet per minute. In this instance, the peripheral speed of the rolls 22, therefore, is likewise ten feet per minute so that the sheet can pass from the conveyor 18 to the rolls 22 without injuring the same. To control the temperature of the sheet, burners or other heating elements 23 are arranged within the leer.

In Fig. 2, the conveyor 24 is heated by the elements 25 below and 26 above. The burners 26 may be adjusted to act directly upon the sheet 10, although the burners are provided primarily to prevent an undue loss of heat from the sheet.

In Fig. 1, a single conveyor 18 is shown within the leer 17, while in Fig. 2, a plurality of conveyors 27 are shown in the annealing leer 28. Although the conveyors 27 can be arranged in groups, the speeds of the conveyors in each group are properly synchronized. Attention is directed to the fact that each conveyor may be sufficiently long to support an entire sheet, while each conveyor is also provided with a variable speed drive so that the speed of the sheet can be varied exteriorly of the leer and at numerous points within the leer. Ordinarily, it is desirable to anneal the sheet of glass relatively slowly in order to permit the use of a relatively short leer. Therefore, because of the high rate of speed at which the sheet is formed, it is preferred that the speed of the forward movement of the sheet through the leer be gradually reduced. On the other hand, the invention is not to be considered limited purely to a reduction in speed of the sheet as it may be desirable in some instances to increase the speed of the sheet as it progresses through the leer. Thus, the speed of the sheet may be reduced from the intake end toward the cold end until the sheet passes through the critical annealing range, from which point the speed of the sheet may be increased toward the outlet end of the leer.

Figs. 3 and 4 represent diagrammatically one method of automatically controlling the speed of the conveyors. The numeral 29 is used to designate a conveyor carrying a sheet of glass 30 toward an adjacent conveyor 31, the conveyors 29 and 31 being driven by means of the drums 32. As shown in Fig. 4, each drum is carried on a shaft 33 terminating in a gear box 34. In the construction illustrated, the shaft 33 carries two sprockets 35 and 36 respectively, both of which are freely rotatable on said shaft. A clutch member 37 is slidable on the shaft 33 between the sprockets 35 and 36, each of which is provided with a member adapted to cooperate with said clutch member. The clutch member is operable through means of a yoke 38 pivoted as at 39. A spring 40 is provided to normally hold the clutch member 37 in engagement with the sprocket 36. It will be noted that a second shaft 41 is arranged within the gear box 34, which shaft carries the sprocket 42 driving a chain 43 trained about the sprocket 35, and a second sprocket 44 driving a chain 45 adapted to drive the sprocket 36. The shaft 41 is connected to a suitable source of power.

Associated with the roll 46 and positioned between the adjacent ends of the conveyors 29 and 31 is a contact member 47 having a portion normally above the upper surface of said conveyors. As clearly shown in Fig. 3, the end of the sheet 30, which is advancing in the direction of the arrow, strikes the upper part of the contact, and due to its resiliency the contact is moved into operable relation with the lower contact, thereby closing the electrical circuit to the electro-magnet. The electro-magnet 48 rocks the end 49 of the arm 38 downwardly about the pivot point 39, thereby throwing the clutch member out of engagement with the sprocket 36 and into engagement with the sprocket 35. The contact 47 will be held in an operative position as long as the sheet is moving thereover, the weight of the sheet being more than sufficient to maintain the contact. As soon as the entire sheet is supported upon the conveyor 31, the contact will move into an inoperative position, thereby allowing the spring 40 to move the clutch member to the position illustrated in Fig. 4.

As shown in Fig. 4, there are three conveyors, lettered for convenience A, B and C. The sheet moves in turn from the conveyor A to B and from B to C. The conveyor A may be the one exteriorly of the leer such as conveyor 12 in Fig. 1, while conveyor B may be conveyor 18 in Fig. 1. With the example above given, the sheet is reduced from sixty feet per minute to forty feet per minute on conveyor A. The conveyor B normally runs at a lower speed such as for instance thirty feet per minute. Normally, the conveyor B is operated when the clutch member 37 is in engagement with the sprocket 36 which gives a thirty foot drive thereto. If the sheet were to pass from the conveyor A to the conveyor B with the two conveyors moving at different speeds, difficulty would be encountered, and therefore the conveyor B is speeded up during the passage of the sheet from conveyor A to B. As soon as the entire sheet is supported on the conveyor B, the spring operates the yoke 38 in a manner to cause the drive to assume its normal position, namely, a speed to drive the conveyor B at thirty feet per minute. The same speed control mechanism or any other automatic device can be associated wtih the conveyors to properly drive the same and to permit passage of the sheet from one conveyor or section of the leer to another.

Although a belt type of conveyor has been illustrated throughout the application, it will be understood that any endless belt formation can be used. From the foregoing, it will be seen that the glass sheet 10 is produced at a relatively high rate of speed, deposited upon a conveyor moving at the same speed as the forming means, and after the entire sheet is deposited upon said conveyor, its speed is reduced. This reduction in speed takes place exteriorly of the annealing leer so that the sheet is passed into the annealing leer at a speed materially less than the sheet forming speed. During the travel of the sheet through the annealing leer, its speed is again varied one or more times, depending upon the character of sheet being handled and other conditions. To permit this variation in the travel of the sheet, the leer is divided into sections, each section or individual parts of each section being provided with variable speed drive means as above set forth.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

In sheet glass apparatus, means for reducing a mass of molten glass to sheet form, a series of conveyor sections arranged to support and carry the sheet forwardly, an annealing leer surrounding at least one of said conveyor sections, variable speed means for driving the conveyor sections in a manner that the speed of the sheet can be varied after it leaves the forming means, magnetic means associated with the conveyor driving means, a roll interposed between adjacent conveyor sections and located beneath the level of the sheet, and a contact member carried by the roll and including a stationary portion and a movable resilient portion projecting upwardly into the path of travel of said sheet and engageable and pressed downwardly by the forward end thereof into engagement with said stationary portion for controlling the operation of said magnetic means.

Signed at Toledo, in the county of Lucas and State of Ohio, this 2nd day of July, 1928.

JAMES C. BLAIR.